United States Patent [19]
Grobecker et al.

[11] Patent Number: 4,805,770
[45] Date of Patent: Feb. 21, 1989

[54] CASSETTE WITH TRAY EJECTION MEANS

[75] Inventors: Hermann Grobecker, Garbsen, Fed. Rep. of Germany; Gilbert E. Mestdagh, Zonhoven, Belgium; Masashi Ito, Osaka, Japan

[73] Assignee: Polygram International Holding B.V., DN Baarn, Netherlands

[21] Appl. No.: 109,806

[22] Filed: Oct. 16, 1987

Related U.S. Application Data

[63] Continuation of Ser. No. 816,547, Jan. 6, 1986, Pat. No. 4,722,439.

[30] Foreign Application Priority Data

Jan. 7, 1985 [DE] Fed. Rep. of Germany .... 3500323.5
Oct. 2, 1985 [EP] European Pat. Off. ........ 85112438.8

[51] Int. Cl.$^4$ ............................................. B65D 85/30
[52] U.S. Cl. ..................................... 206/309; 206/312; 206/444; 206/804; 369/291; 360/133
[58] Field of Search ...................... 206/45.13, 309, 310, 206/312, 313, 387, 444, 454, 804; 360/97, 99, 133; 369/290, 291

[56] References Cited

U.S. PATENT DOCUMENTS

| | | | |
|---|---|---|---|
| 2,304,307 | 12/1942 | Hollis | 206/45.13 |
| 3,140,777 | 7/1964 | Gordan | 206/45.13 |
| 3,684,123 | 8/1972 | Bridges | 206/503 |
| 4,197,958 | 4/1980 | Zeni et al. | 206/503 |
| 4,520,470 | 5/1985 | Costemore | 206/310 |
| 4,535,888 | 8/1985 | Nusselder | 206/311 |
| 4,635,792 | 1/1987 | Yamada et al. | 206/310 |
| 4,694,448 | 9/1987 | Tamaru et al. | 369/291 |
| 4,702,369 | 10/1987 | Philosophe | 206/310 |
| 4,714,157 | 12/1987 | Morrone | 206/387 |
| 4,722,439 | 2/1988 | Grobecker et al. | 206/309 |

FOREIGN PATENT DOCUMENTS 0032279  2/1986  Japan .................................. 206/309

Primary Examiner—David T. Fidei
Attorney, Agent, or Firm—F. Brice Faller

[57] ABSTRACT

Tray (1) for receiving and retaining a rigid circular information disc (4). Can be inserted into a storage cassette (28) and comprises a recess (3) and retaining means (7, 15, 16) for retaining the information disc (4) in the recess (3). The tray (1), which constitutes an easy-to-remove and easy-to-introduce insert for the storage cassette, is constructed as a drawer-type insert for a playing apparatus. The retaining means (7, 15, 16), which include one resilient retaining means (7), are arranged opposite one another on the edge of the recess (3).

7 Claims, 4 Drawing Sheets

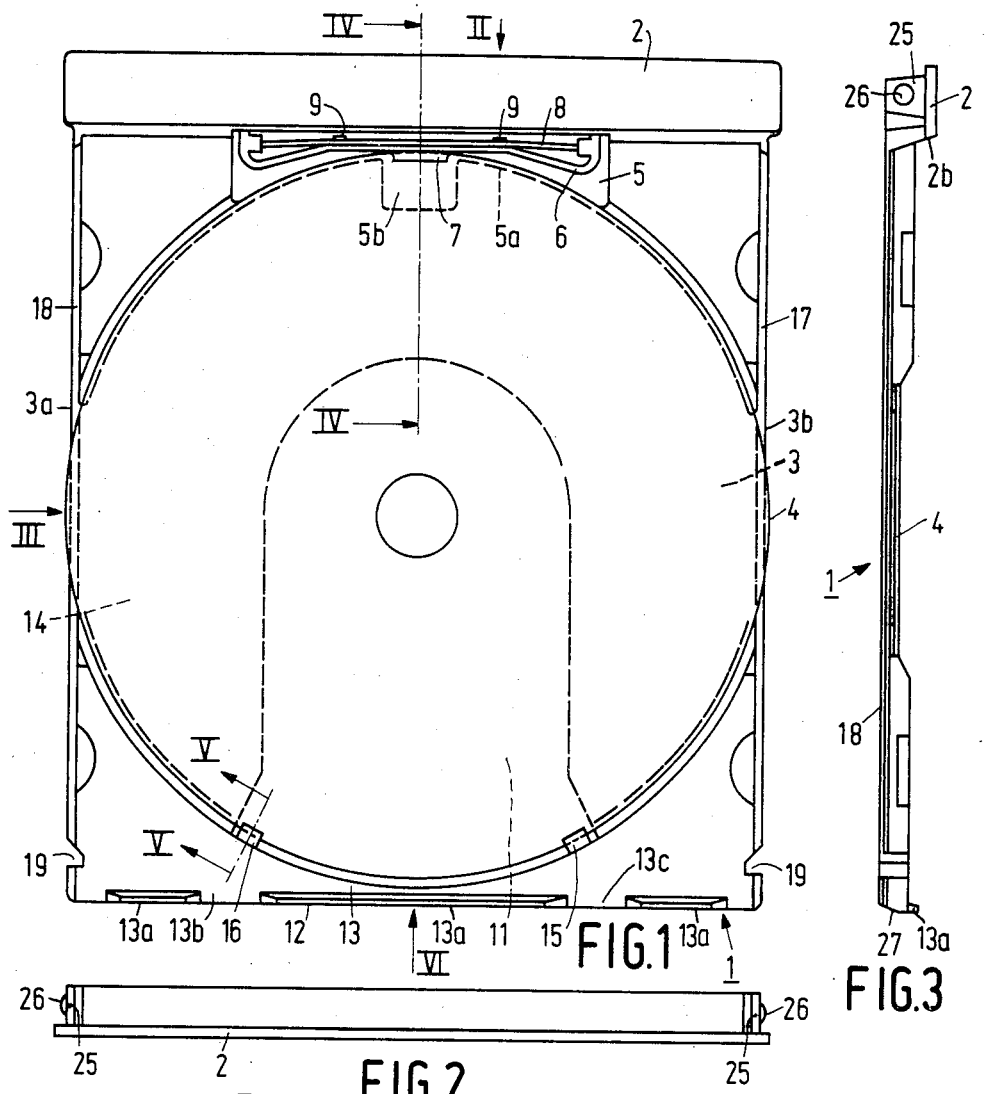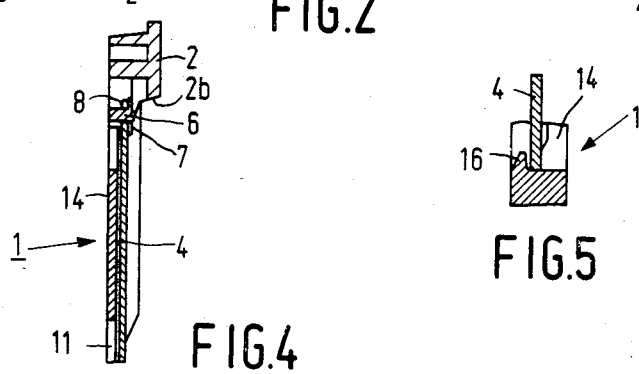

CASSETTE WITH TRAY EJECTION MEANS

This is a continuation of application Ser. No. 816,547, filed Jan. 6, 1986, now U.S. Pat. No. 4,722,439.

BACKGROUND OF THE INVENTION

The invention relates to an element for receiving and retaining a rigid circular information disc, comprising a tray adapted to be inserted into a storage cassette, which tray has a disc receiving recess and retaining means for retaining the information disc in the recess.

Elements of this type are disclosed in European patent application No. 0 114 631 to which U.S. Pat. No. 4,535,888 corresponds, which elements enable information discs to be stored in the storage cassette. Such elements are constructed as inserts for the bottom or the lid of the storage cassette which, like the elements themselves, is injection-moulded plastic. The elements are difficult to remove from the bottom or the lid of the storage cassette and therefore they merely serve to retain the information disc during storage.

Further, it is known from "Funkschau", 21/1984, page 38, to use U-shaped holders for handling optically readable digital audio discs (compact discs) for loading and unloading audio-disc players without touching, the information disc being clamped between the limbs of the U. When such a holder, which may be referred to as a drawer-type insert, is used the information disc should first be removed from its storage cassette and inserted into the holder. A compact disc in such a holder is not easy to handle without touching the disc.

SUMMARY OF THE INVENTION

It is the object of the invention to provide a solution for the problem of handling information discs when loading and unloading a player in such a way that when the information disc is transferred from the storage cassette into the player the disc is easier to handle and need not be touched.

According to the invention this problem is solved in that the tray, which is constructed as an easily removable insert for the storage cassette, is adapted for use as a drawer-type insert for a player, the retaining means, including one resilient retaining means, and further retaining means arranged opposite one another at the edge of the recess.

When the tray has been inserted the information disc is situated in the tray inside the storage cassette during storage. When it is transferred to the player only the tray has to be touched and removed from the cassette. Together with the tray the information disc is transferred to the loading/unloading mechanism of the player. Thus the tray has two functions, namely retaining the information disc during storage in the storage cassette and transferring the information disc from the cassette into the player without the disc being touched.

Since the information disc is retained by facing retaining means arranged at the edge of the disc receiving recess the loading/unloading mechanism can release the disc from the retaining means when the tray is inserted into the player and bring the disc into the playing position.

In an embodiment of the invention one side of the tray has a grip member, the resilient retaining means being arranged near the grip member and the fixed further retaining means being arranged opposite said resilient retaining means. The grip member enables the tray to be easily held and inserted into the loading/unloading mechanism. During insertion the information disc is released by the resilient retaining means which can be pushed aside by the loading/unloading mechanism.

The tray can be formed with a first aperture at the location of the resilient retaining means to insure an easy movement of the resilient retaining means during the insertion movement. It does not lead to an increase in height of the tray because the resilient retaining means can be arranged near the bottom of the tray. The first aperture has an arcuate bounding wall at the side of the disc receiving recess, which bounding wall is substantially concentric with the centre of an information disc to be inserted. In this way the information side of the disc is protected because the information side of the disc can only contact the tray with its outer circumference during insertion into the tray. Further, this construction of the bounding wall results in a reinforcement of the bottom of the receptacle. In addition, the information side is also protected against touching from the underside of the recess. The arcuate bounding wall has a portion which recedes towards the centre and faces the resilient retaining means. The receding portion yields the advantage that a pin of the loading/unloading mechanism can penetrate this portion to urge back the resilient means and thereby release the disc. A projection on the resilient retaining means is arranged in the centre of a resilient member whose ends are secured to the grip member and the first aperture extends over the entire width and depth of the resilient member. The resilient member then has an adequate elasticity and may be made of plastic.

Additional spring means can support the resilient member in its centre. As the elasticity of the resilient plastic member may deteriorate, for example at high temperatures, the spring means guarantees a satisfactory support and a correct return to the supporting position. Such spring means may comprise a spring rod which is clamped in at its ends, which is arranged behind the resilient member and which bears against the resilient member at the location of the projection on the member. The spring rod provides a projection against a deterioration in elasticity of the plastic member and against adverse effects of high temperatures. The spring rod may be mounted at a later stage or may be embedded during injection-moulding of the tray. Alternatively, additional spring means may be constructed as resilient projections which are connected to the grip member. Such resilient projections have the advantage that the tray and the resilient parts can all be made of the same material.

In a further embodiment of the invention the resilient member bears against the bounding wall of the first aperture. The position of the projection on the resilient member is then always accurately defined before insertion of the disc, so that the disc is always correctly retained behind this projection.

A second U-shaped aperture may be formed in the bottom of the recess with a bell-shaped widened portion at the location of the fixed retaining means. The second aperture serves to enable the disc to co-operate with the turntable of the player. The bell-shaped widened portion has the advantage that the recording or read device of the apparatus can move without being obstructed by any parts of the tray.

The tray can be provided with guide strips which extend perpendicularly to the grip member, which guide strips provides a correct guidance during insertion, thereby ensuring a correct cooperation with a loading/unloading mechanism of the player. The guide strips guarantee a correct guidance during insertion into the apparatus and in addition preclude an incorrect insertion, for example if the tray position is turned through 180°.

In another embodiment of the invention the tray is formed with loading/unloading guide means. In such an embodiment further means which facilitate loading and unloading may readily be arranged on the tray.

The invention not only relates to the special construction of the tray but also to a combination with a storage cassette comprising a bottom and a lid. In accordance with a further embodiment of the invention, such a combination is characterized in that the lid is provided with at least one push-up projection which pushes the tray up from the bottom at the location of the grip member after a pivotal movement of the lid through more than 180°. When the lid is pivoted through more than 180° the tray is automatically pushed up at the location of the grip member, so that the grip becomes accessible. This is important because the invention aims at providing a tray which can be used both during storage and during loading and unloading of the disc.

In a further embodiment of the invention there are provided two push-up projections which can be pressed against abutment portions on both ends of the grip member. This construction ensures that the grip member is pushed up uniformly at both ends. In this way the tray cannot be canted as it is pushed upwards.

In a further embodiment of the invention the grip member comprises latching projections on both ends, which projections are engageable in hinge openings in the storage cassette, to provide a pivotal connection of the lid to the bottom. The hinge openings serve for pivoting the lid and for receiving the latching projections to latch the tray. The latching projections can be arranged on elastic portions on the grip member. The elasticity of the elastic portions facilitates removal from and reinsertion of the tray into the storage cassette. The abutment portions can be situated in the direct vicinity of the elastic portions on the grip member. This ensures that the push-up projections are situated close to the latching projections when the lid is provided, and facilitates the disengagement of the tray from the hinge openings.

In a further embodiment of the invention the inner surfaces of the bottom side-walls are formed with projecting portions, underneath which portions of the guide strips are engageable to latch the tray at the side opposite the grip member. This ensures that the tray cannot fall out at the side where it is not latched by means of latching projections.

BRIEF DESCRIPTION OF THE DRAWING

FIG. 1 is a plan view of an element constructed as a tray and of an information disc accomodated in this tray, FIG. 2 shows the element in a side view as indicated by the arrow II in FIG. 1, FIG. 3 shows the element in a side view as indicated by the arrow III in FIG. 1, FIG. 4 is a sectional view of the element taken on the line IV—IV in FIG. 1, FIG. 5 is an enlarged-scale sectional view of a part of the element, taken on the line V—V in FIG. 1.

DETAILED DESCRIPTION OF THE PREFERRED EMBODIMENTS

Figures 6, 7, 8, 9:
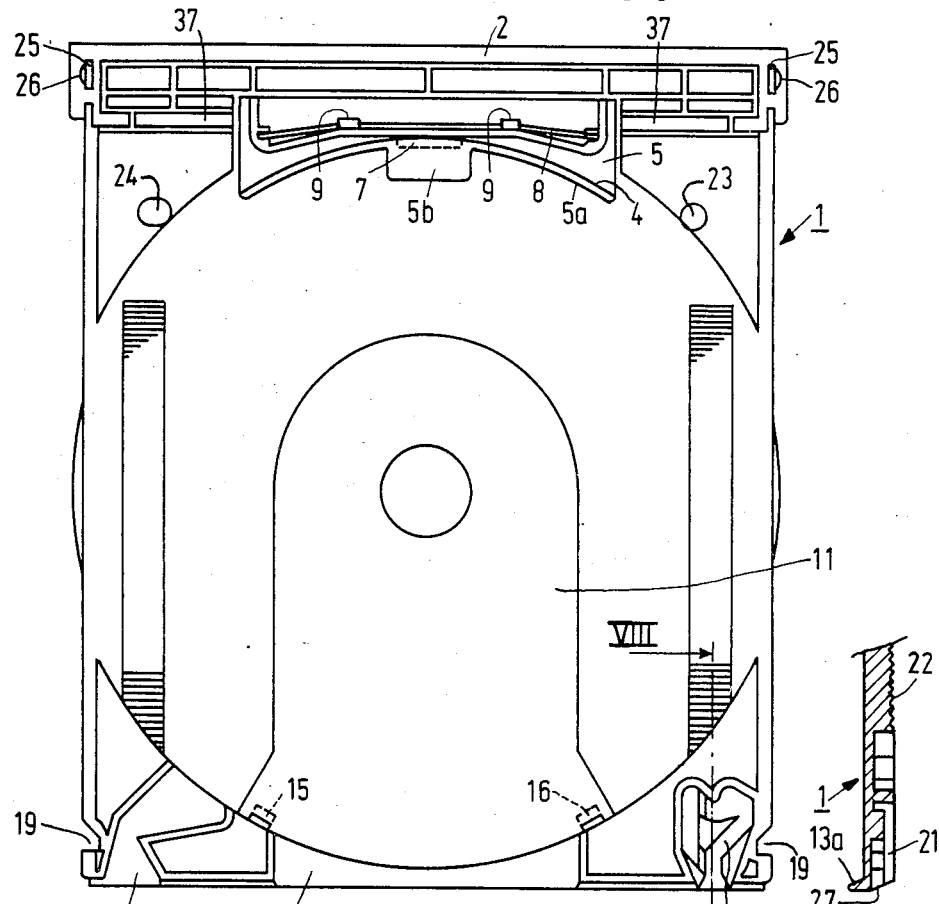
FIG. 6 shows the element in a side view as indicated by the arrow VI in FIG. 1.
FIG. 7 is a plan view at the underside of the element of FIG. 1.
FIG. 8 is a sectional view of the element, taken on the line VIII—VIII in FIG. 7.
FIG. 9 shows of part of the element in a modified embodiment.

As is shown in FIG. 1, tray 1 comprises a rectangular plate with a grip member 2 (see also FIGS. 2, 3 and 4). The plate and the grip member are injection-moulded plastic. Preferably, the grip member has a ribbed upper surface for a better grip. The same applies to the underside of the tray, in particular at the location of the grip member 2. The center of tray 1 is formed with a receptacle 3 which is slightly recessed and which is slightly larger in diameter than an information disc 4. In the present example the information disc is a Compact Disc (an optically readable digital audio disc). At the edges 3a, 3b the receptacle is open in such a way that the edge of the information disc can easily be gripped. Between the edge of the receptacle 3 and the grip member 2 a first aperture 5 is formed. This first aperture 5 has a specific width. A resilient plastic member 6 is arranged in the first aperture 5 and is preferably integral with the tray. The ends of the resilient member 6 adjoin the grip member. A retaining means in the form of a projection 7 is provided in the middle of the resilient member 6 and extends towards the centre of the tray. The projection 7 is urged inwards as a result of the elasticity of the resilient member. The resilient member 6 is supported by a spring rod 8 (see also FIG. 7). The spring rod 8 may be mounted at a later stage or may be embedded during injection-moulding. For subsequent mounting of the spring rod 8 insertion slots are formed in the end portions of the resilient member 6. Further, the resilient member 6 comprises retaining portions 9 to retain the spring rod 8. Towards the receptacle 3 the aperture 5 is bounded by an arcuate bounding wall 5a. This bounding wall 5a substantially coincides with the disc edge and has a recording portion 5b opposite the retaining means 7, which receding portion 5b extends towards the tray centre and has a substantially rectangular shape. This receding portion 5b is engageable by a pin of the loading mechanism of a player.

As is shown in FIG. 9, the resilient support may alternatively be provided by resilient plastic projections 10 which project from the grip member 2 and bear against the rear of the resilient member 6. Preferably, the resilient projections 10 are integral with the tray.

Figure 10:
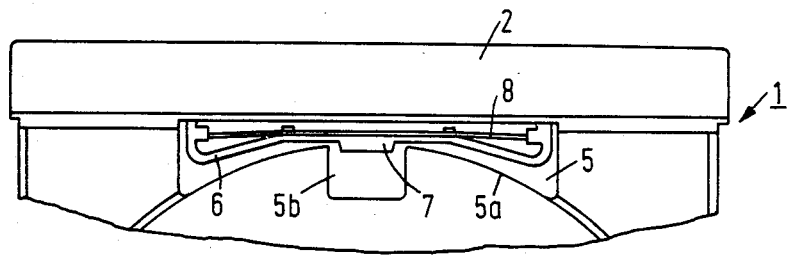
FIG. 10 shows a modified part of the element of FIG. 1 without information disc.

FIG. 10 shows an alternative construction of the resilient member 6, which is such that when the tray contains no disc the resilient member is urged against the arcuate bounding wall 5a by the spring rod 8, so that the retaining means 7 is positioned accurately. After insertion of the disc, the member 6 is preferably clear of the bounding wall 5a. In the construction shown in FIG. 10, but also in the other constructions, it is advantageous if the upper side of the retaining means 7 has a bevelled edge. This bevelled edge serves to facilitate insertion of the disc 4 into the receptacle 3 and engagement of the disc behind the retaining means 7.

Figure 11B:
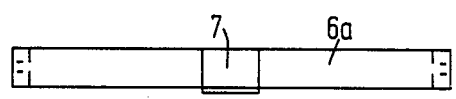
FIG. 11b shows a resilient member used in the element shown in FIG. 11a, FIG. 12a shows a modified part of the element of FIG. 1 without information disc.
Figure 11A:
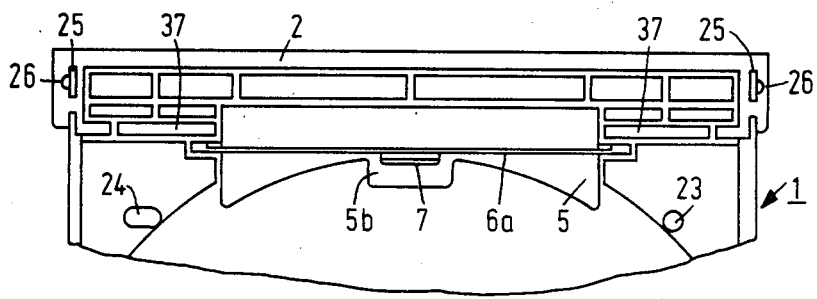
FIG. 11a shows a modified part of the element of FIG. 1 without information disc.

FIGS. 11a and 11b show an alternative in which the retaining means 7 is provided with a blade spring 6a in its centre. The blade spring 6a is a metal spring and provides a satisfactory support for the disc even at higher temperatures. The retaining means 7 is made of plastic and is moulded around or glued to the blade spring.

Figure 12B:
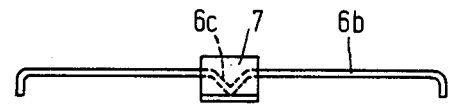
FIG. 12b shows a resilient member used in the element shown in FIG. 12a FIG. 13 is a sectional view of a combination of a storage cassette and an information-disc tray contained in this cassette.
Figure 12A:
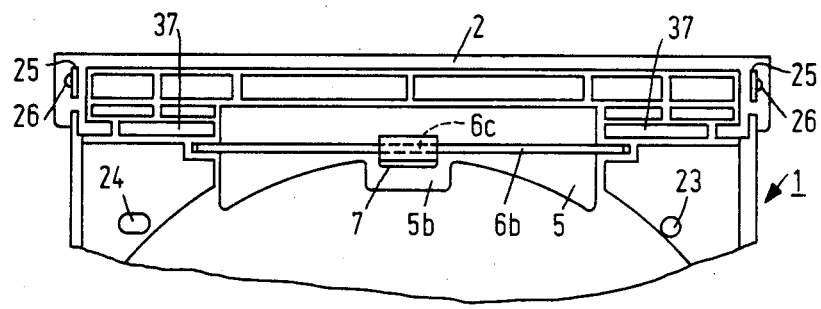

As is shown in FIGS. 12a and 12b the retaining means 7 may also be provided with a wire spring 6b in its centre. In this respect it is advantageous to bend the spring 6b in its centre 6c and to mount the retaining means by embedding. As another alternative a helical spring may be provided in a manner, not shown, instead of a blade spring or wire spring.

A second aperture 11 is formed at the location of the receptacle 3, which aperture is U-shaped and is widened at its ends so as to be bell-shaped at the side which is remote from the grip. Across the U-shaped aperture at the side which faces the grip member 2 the tray is provided with a bridge 13. The bridge serves to improve the stability of the side 12. As will be apparent from FIG. 6 the bridge 13 is situated at the slightly higher level than the bottom 14 of the receptacle 3. The bridge 13 has a lateral edge 13a which extends upwardly and which is formed with recesses 13b and 13c.

At the location of the recess 11 fixed retaining means 15 and 16 are arranged in such a way relative to the bottom 14 that the disc 4 is clamped between the bottom 14 and the retainers 15, 16. The projections 15, 16 are situated at the location of the bridge 13. The projection 16 is shown on an enlarged scale in FIG. 5.

Guide strips 17, 18 are arranged at the opposed lateral edges 3a, 3b and serve to guide the tray 1 during its insertion into the loading/unloading mechanism of the player. Since the guide strips are arranged on the underside of the tray 1 they preclude an incorrect insertion of the tray into the loading/unloading mechanism.

First loading/unloading guide means in the form of notches 19 are provided at the location of the lateral guide strips 17, 18 and are formed by interruptions in the guide strips 17, 18. The loading/unloading mechanism is engageable in notches 19 to insert or remove the tray. As is shown in FIG. 7, there are provided second loading/unloading guide means in the form of hooked shaped recess 20 which serve a similar purpose. Opposite the recess 20 there is provided a third loading/unloading guide means, in the form of heart-shaped recess 21. This third loading/unloading guide means 21, which is shown in FIG. 8, serves for retaining the tray in a multi-tray holder, not shown, which operates in accordance with the push-push principle. This means that the tray is latched in the holder by pushing the first time and can pop out after pushing a second time. Further, there are provided gear-rack means 22 which extend in the direction of insertion and which are adapted to cooperate with gear wheels of an insertion mechanism. In the bottom there are provided locating holes 23, 24. The locating holes 23 is circular and the locating hole 24 is slightly elongate. These holes enable the tray to be positioned reliably and accurately in the player after the loading operation.

The underside of the grip member 2 is formed with portions 25 which project substantially perpendicularly from the grip member. Since the portions 25 project freely they are slightly flexible. The portions 25 carry latching projections 26 (FIGS. 3 and 7) which extend outwardly.

Figure 13:
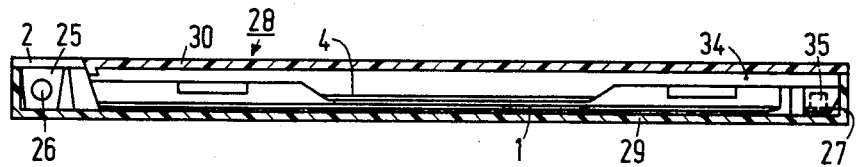
Figure 14:
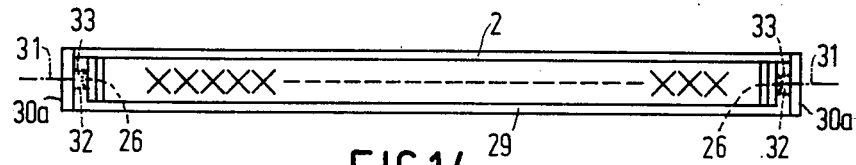
FIG. 14 is a side view of the combination shown in FIG. 13.

As is shown in FIG. 3, the side 12 of the tray 1 facing the grip member 2 is formed with a bevelled edge 27 which serves to facilitate insertion of the tray into a storage cassette 28 (FIGS. 13 and 14). This storage cassette 28 comprises a bottom 29 and a lid 30, which are pivotally connected to each other by means of a hinge 31. The hinge 31 comprises hinge openings 32 in the bottom section 29 and hinge pins 33 which engage these openings 32 and which are arranged on limbs 30a of the lid. In the same way as the hinge pins 33 the latching projections 26 engage in the hinge opening 32 in the bottom section at the side which is remote from limbs 30a. The openings 32 thus latch the tray in the bottom section 29 and connect the lid pivotally to the bottom.

Referring to FIG. 13, side walls 34 of the bottom 29 carry projecting portions 35 underneath which the guide strips 17, 18 of the disc receiving tray can engage. Thus, the tray 1 is also connected to the bottom 29 at the side which is remote from the grip member 2. The side walls 34 of the bottom section are also formed with lateral openings to facilitate insertion of the information disc 4.

Figure 15:
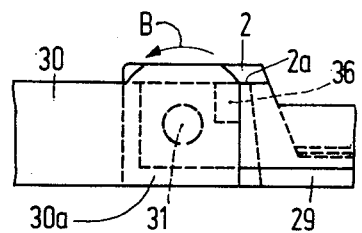
FIG. 15 is a sectional view of the storage cassette at the location of the hinge between the bottom and the lid, the lid being shown in a position in which it is pivoted through 180° relative to the bottom.
Figure 16:
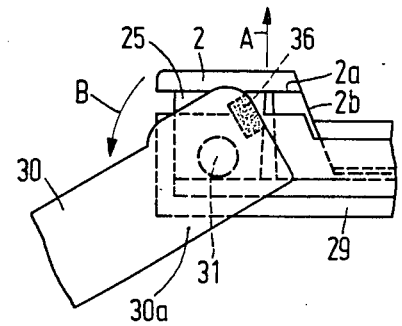
FIG. 16 shows the hinge construction shown in FIG. 15, the lid being shown in a position in which it is pivoted through more than 180° relative to the bottom.

Referring to FIGS. 15 and 16, the inner sides of the limbs 30a carry push-up projections 36. At the location of the openings 32 the side walls 34 should be slightly thinner in order not to obstruct the push-up projections 36 during the pivotal movement. As is shown in FIG. 15, the push-up projections 36 abut against abutment portions 2a on the grip member 2 after a pivotal movement through 180°, so that the grip member and hence the tray is pushed up from the bottom in the direction indicated by the arrow A in FIG. 16. Pushing up is effected when the lid 30 is pivoted through an angle of more than 180° in the direction indicated by the arrow B in FIG. 16. The grip member 2 is then easy to grip to remove the tray 1 from the bottom section 29. The guide strips 17, 18 become dis-engaged from the projecting portions 35 during lifting. Thus, the tray 1 is released.

After removal of the tray with the disc 4 from the storage cassette 28, the tray can be inserted into the loading/unloading mechanism. The retaining means 7 is then pressed back and the disc is freed.

Thus, the tray has two functions, namely to retain the information disc and to assist in loading and unloading of the disc into/from the player. The tray makes it possible to replace the insert in a conventional storage cassette. Preferably, the tray 1 is made of a mixture of synthetic resins such as polycarbonate. This material ensures that the tray has a good stability.

Figure 17:
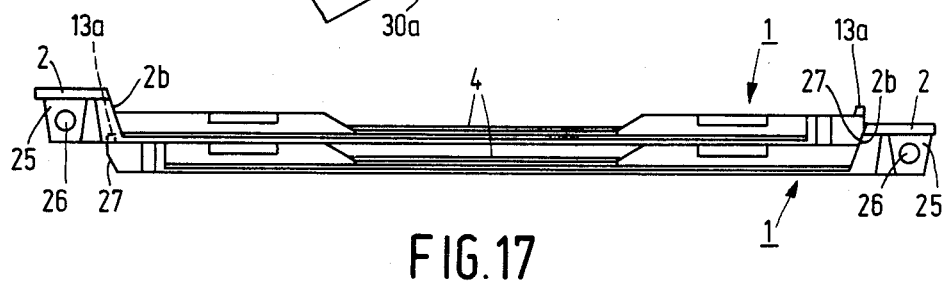
FIG. 17 is a side view of a combination two stacked elements as shown in FIG. 1.

As is shown in FIG. 17, the trays in accordance with the invention can be stacked by adapting the geometries of the upper sides and lower sides of the trays. The bevelled edge 27 of the first tray then adjoins the bevelled edge 2a of the grip member 2 of the second tray after the trays have been turned through 180° relative to each other. The central portion of the lateral edge 13a of the second tray engages the recess 5 of the first tray and the lateral portions of the edge 13a engage elongate recesses 37, formed in the bottom of each tray, as is shown in FIG. 7. This precludes a displacement of the stacked trays relative to each other.

What is claimed is:

1. A combination of a storage cassette comprising a bottom and a pivotably connected lid with a removable tray, adapted to be inserted into said bottom, which tray has a disc receiving recess, retaining means for retaining an information disc in the recess and a grip member at one end characterized in that the lid is provided with at least one push-up projection which pushes the tray up from the bottom at the location of the grip member after a pivotal movement of the lid through more than 180°.

2. A combination as in claim 1, wherein the lid is provided with two push-up projections, said grip member having respective abutment portions on opposite ends thereof, said push-up projections bearing against respective abutment portions after a pivotal movement of the lid through 180°.

3. A combination as in claim 1 wherein said grip member has latching projections on opposite ends thereof, said storage cassette having respective hinge openings therein, said latching projections engaging said hinge openings to provide a pivotal connection of the lid to the bottom.

4. A combination as in claim 3 wherein said latching projections are resilient.

5. A combination as in claim 4 wherein the tray comprises a pair of guide strips extending perpendicularly of the grip member on opposite sides of the tray, the bottom of the cassette having a pair of respective opposed sidewalls which receive said tray between the inner surfaces thereof, said inner surfaces having projections which engage respective guide strips to latch the tray remote from the grip member.

6. A tray for receiving and retaining an information disc, having a disc receiving recess and retaining means for retaining the disc in the recess and having a grip member at one side, characterized in that the tray has a lower surface formed with at least one elongate recess arranged near said grip member on an opposed upper surface formed with at least one upstanding lateral edge portion opposite said disc receiving recess from the grip member, the upper and lower surfaces of each tray being profiled so that the trays can be stacked after they have been turned through 180° relative to each other, in such a way that after stacking the lateral portion of a first tray engages the elongate recess in a second tray.

7. A tray as claimed in claim 6, characterized in that the grip member has a first bevelled edge at the side of the grip member facing the said one side of the tray, the side of the tray facing the grip member being formed with a second bevelled edge, the first bevelled edge of the first tray adjoins the second bevelled edge of the second tray after the trays have been stacked.

* * * * *